United States Patent
Choi (10) Patent No.: US 6,996,039 B2
(45) Date of Patent: Feb. 7, 2006

(54) OPTICAL PICK-UP ACTUATOR

(75) Inventor: In Ho Choi, Sungnam (KR)

(73) Assignee: LG Electronics Inc., Seoul (KR)

( * ) Notice: Subject to any disclaimer, the term of this patent is extended or adjusted under 35 U.S.C. 154(b) by 643 days.

(21) Appl. No.: 09/812,980

(22) Filed: Mar. 20, 2001

(65) Prior Publication Data

US 2002/0021634 A1    Feb. 21, 2002

(30) Foreign Application Priority Data

Mar. 21, 2000 (KR) ............................ 2000-14245

(51) Int. Cl.
G11B 7/00 (2006.01)
G11B 7/08 (2006.01)
(52) U.S. Cl. .................. 369/44.32; 369/53.19; 720/683
(58) Field of Classification Search ............ 369/30.45, 369/244, 43, 44.11, 49.14–17, 44.21, 44.22, 369/53.28, 44.32, 53.19, 44.16, 247, 249; 359/813, 819, 823; 720/683
See application file for complete search history.

(56) References Cited

U.S. PATENT DOCUMENTS

| | | | | |
|---|---|---|---|---|
| 4,767,187 A | * | 8/1988 | Gijzen et al. | 359/813 |
| 5,467,328 A | * | 11/1995 | Murakami et al. | 369/44.16 |
| 5,475,661 A | * | 12/1995 | Tomita et al. | 369/44.16 |
| 5,519,677 A | * | 5/1996 | Shibata et al. | 369/44.16 |
| 5,740,139 A | * | 4/1998 | Marino et al. | 369/44.32 |
| 5,903,539 A | * | 5/1999 | Tanaka | 369/221 |
| 6,181,670 B1 | * | 1/2001 | Nagasato | 369/244 |
| 6,295,255 B1 | * | 9/2001 | Seo et al. | 369/44.32 |
| 6,341,104 B1 | * | 1/2002 | Yamaguchi et al. | 369/44.15 |
| 6,515,947 B1 | * | 2/2003 | Takishima | 369/44.14 |

FOREIGN PATENT DOCUMENTS

JP            09231593 A    *  9/1997

* cited by examiner

Primary Examiner—Brian E. Miller
Assistant Examiner—Peter Vincent Agustin
(74) Attorney, Agent, or Firm—Lee, Hong, Degerman, Kang & Schmadeka (57) ABSTRACT

Disclosed is an optical pick-up actuator configured to achieve a multiaxial driving operation using a combination of a moving magnet system and a moving coil system. The optical pick-up actuator includes a first magnet unit, and a second magnet unit. The first magnet unit serves to conduct a tilt compensation, and the second magnet serves to conduct focusing and tracking operations. The first magnet unit for the tilt compensation is configured to conduct a tilt compensation in a tangential direction and a tilt compensation in a radial direction in an independent fashion.

4 Claims, 11 Drawing Sheets

Direction of Current
- ⊙ out
- ⊗ in

OPTICAL PICK-UP ACTUATOR

CROSS-REFERENCE TO RELATED APPLICATIONS

Pursuant to 35 U.S.C. §119(a), this application claims the benefit of earlier filing date and right of priority to the Korean Application No. 14245/2000, filed on Mar. 21, 2000, the content of which is hereby incorporated by reference herein in its entirety.

BACKGROUND OF THE INVENTION

1. Field of the Invention

The present invention relates to an optical pick-up actuator for a tilt compensation servo associated with high-density disks.

2. Description of the Related Art

With the development of disk media capable of optically recording information and reproducing the recorded information, diverse products have been developed in association with optical pick-up devices adapted to read information recorded on disks.

In an optical recording/reproducing system for optically recording and reproducing information, an object lens driving unit configured to allow an optical spot to follow the surface vibrations and eccentricity of a disk is used, along with the optical system of a pick-up device, in order to achieve desired focusing and tracking operations.

This object lens driving unit is called an "optical pick-up actuator". The current tendency of designs and developments associated with such an optical pick-up actuator is toward those suitable for high-density disks.

Generally, such an optical pick-up actuator includes a lens holder adapted to hold an object lens. The lens holder should be configured to move upward, downward, left and right directions, for desired focusing and tracking operations of the object lens. This driving unit also includes coils arranged in a magnetic space defined by a magnet and a magnetic body, so that it utilizes a Lorentz force according to the Fleming's left-hand law.

FIGS. 1a to 1c are schematic views respectively illustrating the configuration of a conventional optical pick-up actuator.

Referring to FIGS. 1a to 1c, the conventional optical pick-up actuator includes a lens holder 102 adapted to hold an object lens 101, magnets 103, yokes 106, a focusing coil 108, a tracking coil 109, fixed printed circuit boards (PCBs) 110, a plurality of wire springs 111, and a frame 112.

Figure 1:
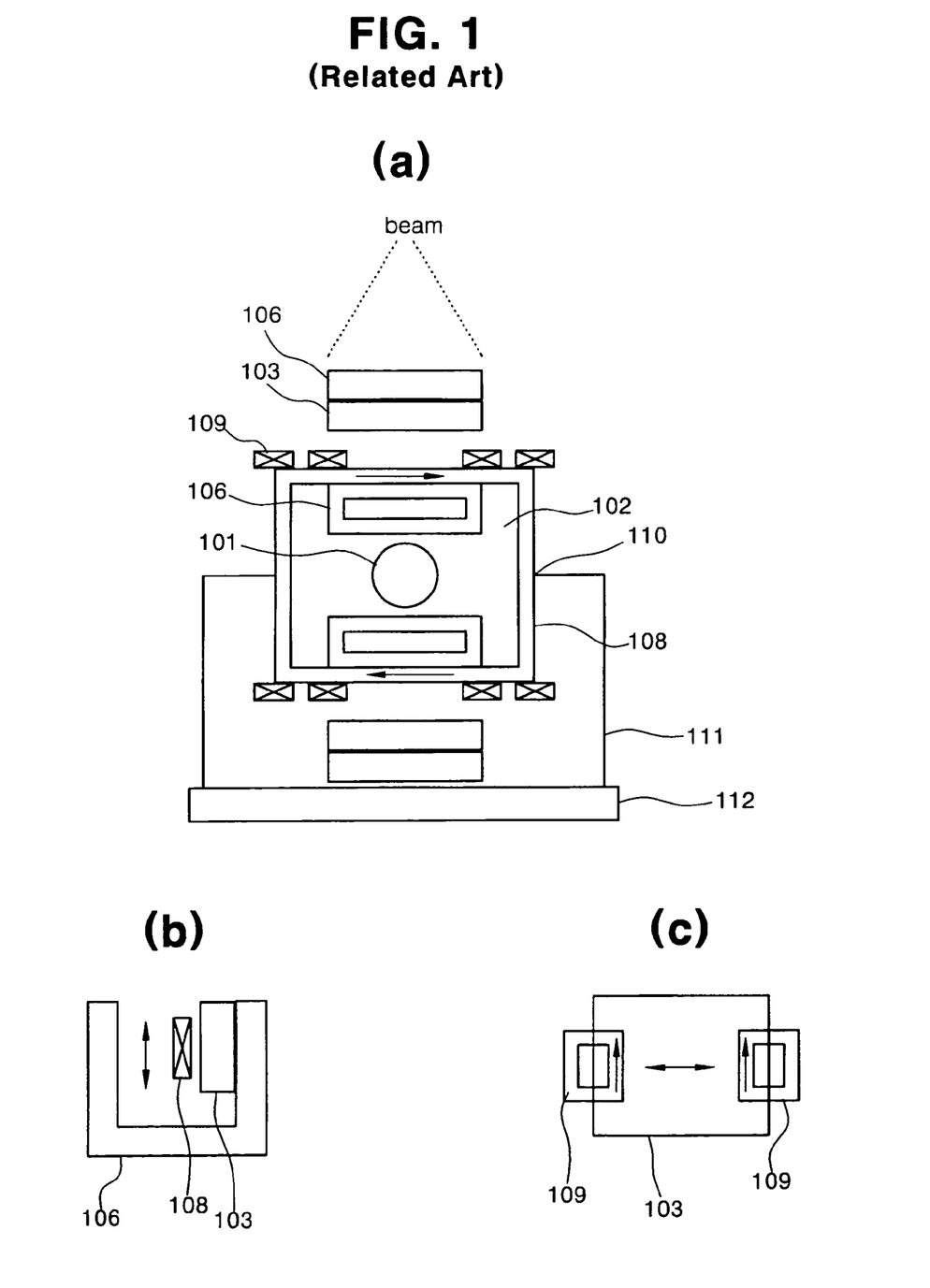
FIGS. 1a to 1c are schematic views respectively illustrating the configuration of a conventional optical pick-up actuator.

In the optical pick-up actuator illustrated in FIG. 1, the lens holder 102 mounted with the object lens 101 is movable in accordance with the function of the wire springs 111. The object lens 101 is centrally attached to the lens holder 102. The focusing coil 108 is wound around the lens holder 102. The tracking coil 109, which is wound in a rectangular form, is attached to the upper surface of the focusing coil 108. The fixed PCBs 110 are fixedly mounted to opposite side surfaces of the lens holder 102, respectively The yokes 106 are symmetrically arranged at opposite vertical sides of the object lens 101, respectively. The magnets 103 are arranged to apply magnetic flux to the tracking coil 109 and focusing coil 108, thereby causing the tracking coil 109 and focusing coil 108 to generate electromagnetic forces, respectively.

The yokes 106 are installed to be integral with a pick-up base, using an integral attachment means.

The frame 112 is arranged at one edge of the optical pick-up actuator. A main PCB not shown is fixedly mounted to the frame 112 by means of set screws. Each of the wire springs 111 is coupled to the frame 112 at one end thereof. Typically, four wire springs 111 are coupled to the frame 112. The other end of each wire spring 111, which is coupled to the frame 112 at one end thereof, is connected to an associated one of the fixed PCBs 110 attached to the lens holder 102. In accordance with such an arrangement, the lens holder 102 is maintained in a suspended state by the wire springs 111.

As shown in FIGS. 1b and 1c, the conventional optical pick-up actuator having the above mentioned configuration is a biaxially-driving optical pick-up actuator. That is, the coils of this optical pick-up actuator, that is, the focusing coil 108 and tracking coil 109, are arranged in such a fashion that they face the magnets 103, so that the focusing coil 108 carries out upward and downward driving (focusing) operations whereas the tracking coil 109 carries out left and right driving (tracking) operations.

Due to a reduced tilt margin resulting from an application to high-density disks and a limited tilt tolerance allowed in the assembling work, however, it is required to use a servo for compensating a tilt occurring during the driving operation of the actuator, in addition to the configurations required for the tracking and focusing operations.

Figure 2:
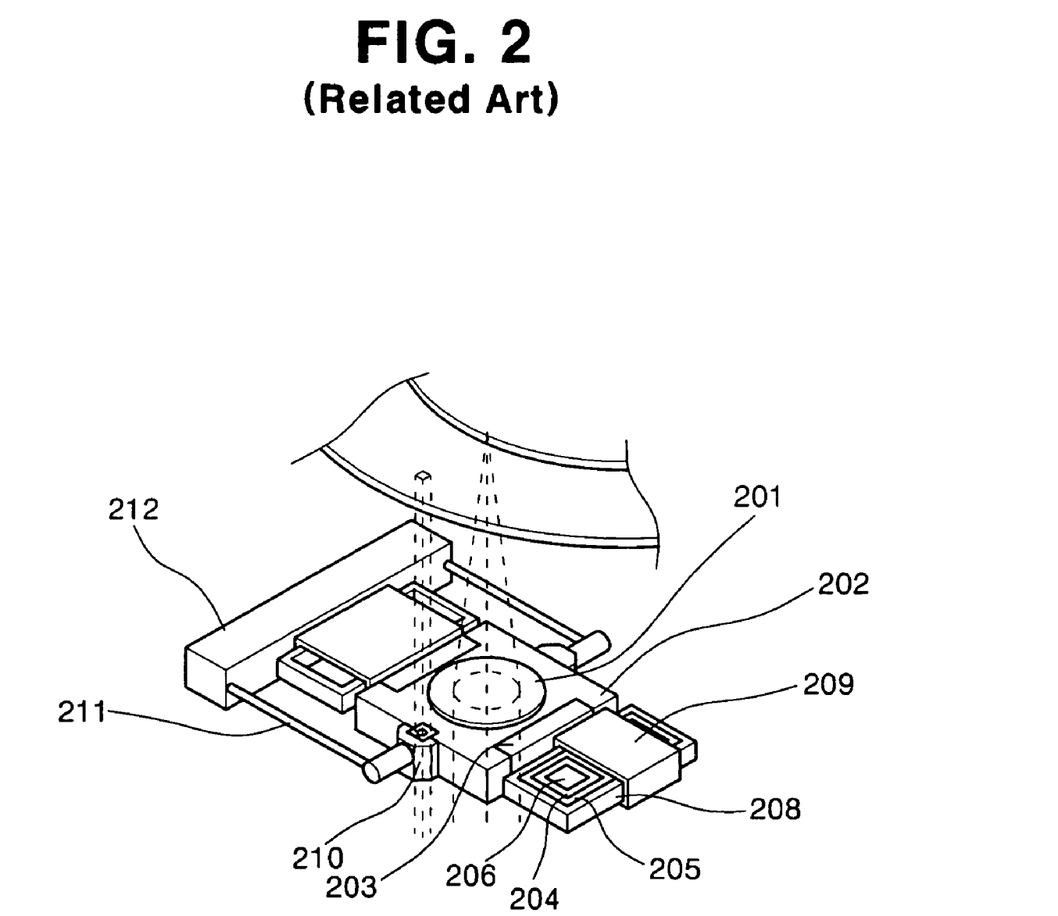
FIG. 2 is a schematic view illustrating the configuration of a conventional quadaxially-driving optical pick-up actuator.

FIG. 2 schematically illustrates the configuration of a conventional quadaxially-driving optical pick-up actuator.

Referring to FIG. 2, the conventional quadaxially-driving optical pick-up actuator has a driving configuration having a desired degree of freedom in radial and tangential direction, in addition to a desired degree of freedom in the focusing and tracking driving directions.

This driving configuration will now be described in detail. In the quadaxially-driving optical pick-up actuator, two coils are symmetrically arranged at a fixed body, as in the case of FIG. 1a. Two additional coils 204 and 205 are symmetrically arranged in order to achieve radial and tangential driving operations for a tilt compensation. A pair of magnets 203 are attached to a moving body while facing the coils 204 and 205. In accordance with such arrangements, a lens holder 202 attached with the magnets 203 can be driven while having four degrees of freedom. This optical pick-up actuator conducts a servo operation, based on error signals respectively indicative of tilt variations of the lens and disk optically detected.

Although the connection of the tracking and focusing coils to a power source is achieved by the four wire springs adapted to provide a desire support in the configuration of FIG. 1a, an additional power connection means is required to connect the tilting coils in the case of FIG. 2, in addition to the four wire springs used for the tracking and focusing coils. As a result, the configuration of FIG. 2 is complex The additional magnets attached to the lens holder are considerably heavier than the lens holder. For this reason, a considerable increase in the mass of the moving body occurs, thereby resulting in a degradation in sensitivity.

Furthermore, where the above-mentioned optical pick-up actuator is applied to high-density disks, the frequency characteristics for focusing and tracking servos are undesirably shifted toward a higher frequency band because of an increased data processing rate and a reduced high-pass surface vibration limit.

SUMMARY OF THE INVENTION

Therefore, an object of the invention is to provide an optical pick-up actuator capable of achieving a tilt compensation in addition to focusing and tracking operations while achieving a multiaxial driving operation using a combination of a moving magnet system and a moving coil system.

Another object of the invention is to provide an optical pick-up actuator capable of improving the characteristics of a main servo adapted to read information form a disk, and achieving a tilting operation without any problem associated with an application of electric power.

In accordance with one aspect, the present invention provides an optical pick-up actuator comprising: a lens holder mounted with an object lens and attached with coils at an outer surface thereof; a plurality of wire springs adapted to support the lens holder; a fixed body mounted with the lens holder and attached with a pair of first magnets and coils, the first magnets and the coil serving to move the lens holder in a desired direction; a frame adapted to support one end of each of the wire springs; and second magnets mounted to the lens holder and adapted to move the lens holder in a direction different from the direction of the movement carried by the first magnets and the coil.

In accordance with another aspect, the present invention provides an optical pick-up actuator mounted with an object lens and driven by a magnetic suspension, thereby recording information on a disk and reproducing the recorded information from a disk, comprising: first magnet means operated by a moving magnet system to conduct tracking and focusing operations; and second magnet means operated by a moving coil system to conduct a tilt compensating operation.

In accordance with another aspect, the present invention provides an optical pick-up actuator mounted with an object lens and driven by a magnetic suspension, thereby recording information on a disk and reproducing the recorded information from a disk, comprising: first magnet means operated by a moving coil system to conduct tracking and focusing operations; and second magnet means operated by a moving magnet system to conduct a tilt compensating operation.

The optical pick-up actuator according to the present invention is configured to use a combination of a moving magnet system and a moving coil system, so that it can improve the characteristics of a main servo adapted to read information form a disk while achieving a tilting operation without any problem associated with an application of electric power.

The first magnet means is adapted to conduct a tilt compensation in a tangential direction and a tilt compensation in a radial direction.

The first magnet means comprises a magnet unit for conducting a tilt compensation in a tangential direction, and a magnet unit for conducting a tilt compensation in a radial direction.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 3:
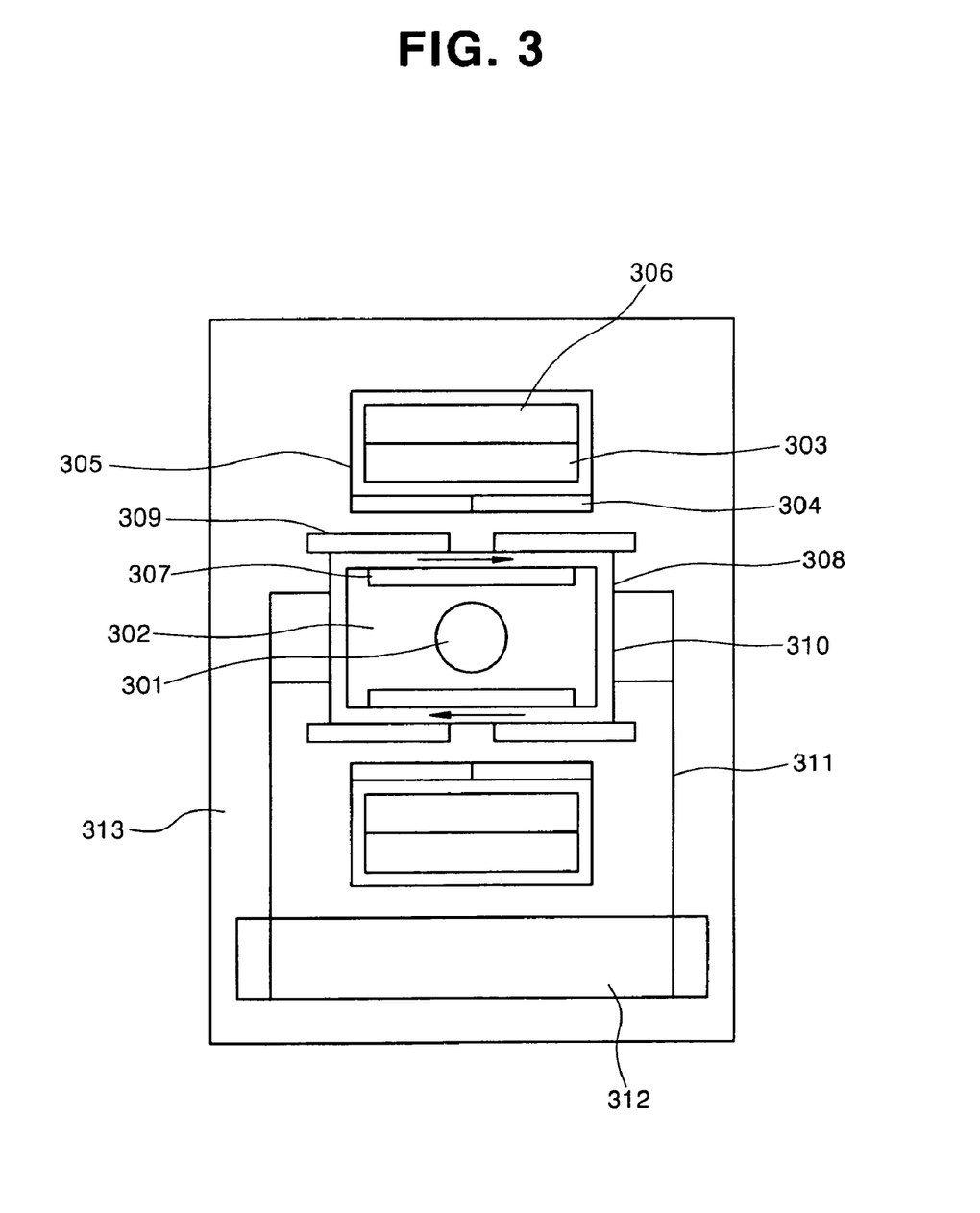
FIG. 3 is a schematic view illustrating the configuration of an optical pick-up actuator according to a first embodiment of the present invention.

FIG. 3 is a schematic view illustrating the configuration of an optical pick-up actuator according to a first embodiment of the present invention.

For the convenience of explanation, the figures relating to the present invention is illustrated by using a moving coil system for the main driving circuit and a moving magnet system for the tilt driving magnetic circuit, though present invention is configured to use a combination of a moving magnet system and a moving coil system.

As shown in FIG. 3, the optical pick-up actuator according to the first embodiment of the present invention includes a lens holder 302 adapted to hold an object lens 301, a yoke 306, a pair of first magnets 303, a pair of second magnets 307, a radial coil 304, a tangential coil 305, a tracking coil 309, a focusing coil 308, fixed PCBs 310, a plurality of wire springs 311, and a frame 312. In accordance, with one embodiment of the present invention, a moving body preferably comprises the lens holder 302 adapted to hold the object lens 301, whereas a fixed body preferably comprises the yoke 306.

The focusing and tracking operations in the optical pick-up actuator according to the first embodiment of the present invention are conducted in a moving coil fashion whereas the tangential and radial tilting operations in the same optical pick-up actuator are conducted in a moving magnet fashion.

FIGS. 4a to 4d are views illustrating the driving principle of the optical pick-up actuator according to the first embodiment of the present invention in association with each direction.

Now, the operation of the optical pick-up actuator according to the first embodiment of the present invention will be described in conjunction with FIG. 3 and FIGS. 4a to 4d.

As mentioned above, FIGS. 4a to 4d are views illustrating the driving principle of the optical pick-up actuator in association with the radial and tangential directions. In accordance with this driving principle, a current flows through the coil in a radial or tangential driving direction depending on the polarity of the magnets.

In detail, the second magnets 307 are attached to the lens holder 302 holding the object lens 301, in order to achieve a tilting operation. The radial coil 304 and tangential coil 305 are fixed to the first magnets 303. When current flows through the radial coil 304 and tangential coil 305, a Lorentz force is generated in accordance with the Fleming's left-hand law. By virtue of the Lorentz force, the first magnets 303 are driven.

At this time, the first magnets 303, the second magnets 307, and the yoke 306 form a magnetic circuit to generate magnetic flux at the radial coil 304 and tangential coil 305. In accordance with an interlinkage of the magnetic flux, a desired force is generated.

Figure 4A:
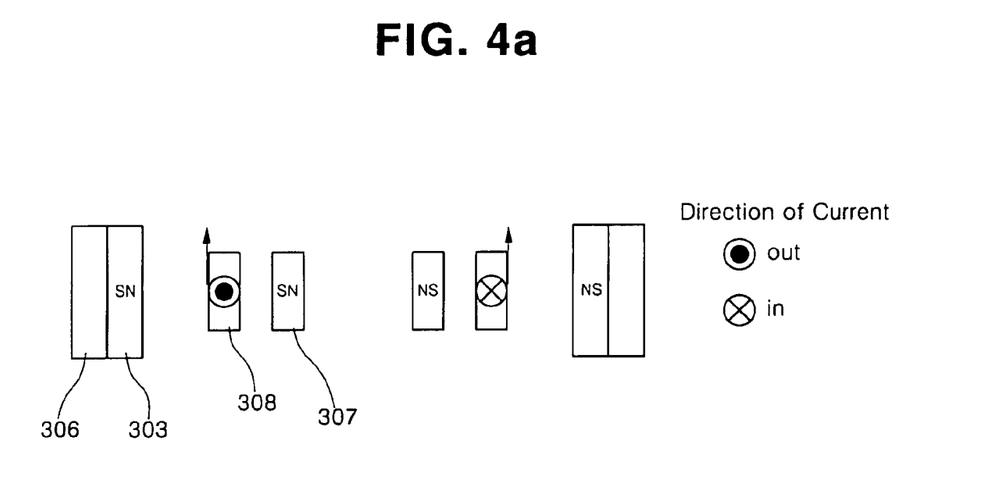
FIGS. 4a to 4d are views illustrating the driving principle of the optical pick-up actuator according to the first embodiment of the present invention in association with each direction.
Figure 4B:
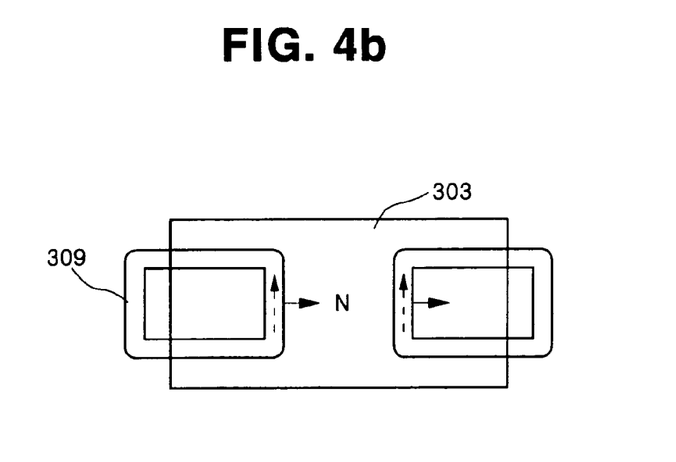
Figure 4C:
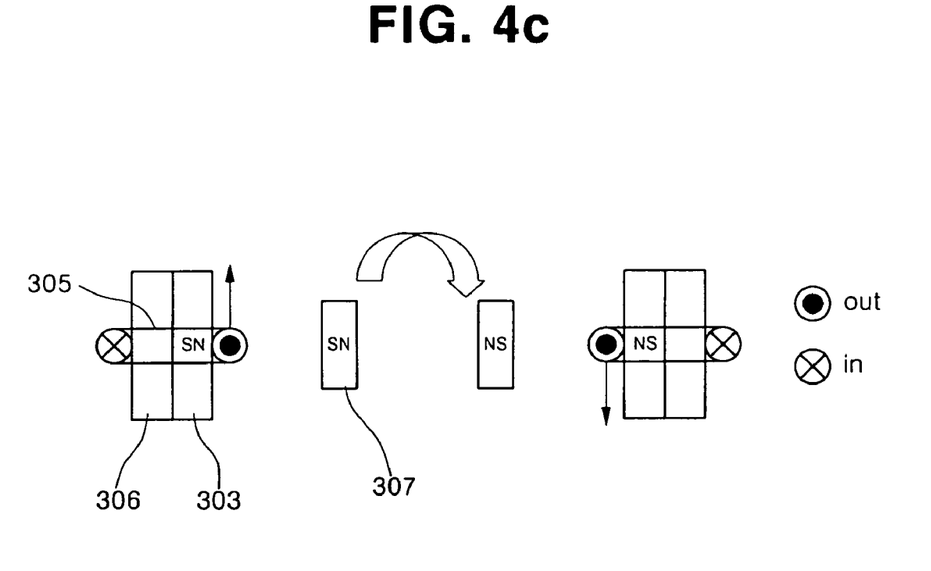
Figure 4D:
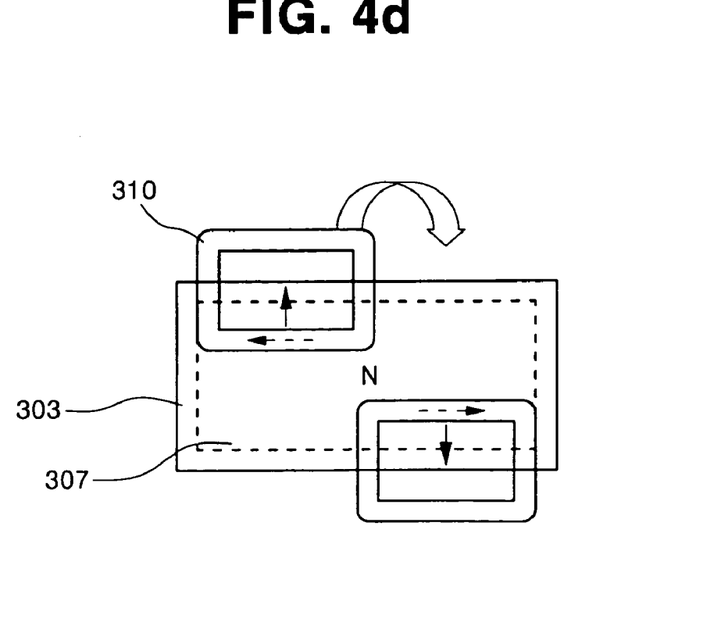

FIGS. 4a and 4b illustrate the focusing and tracking operations, respectively.

The focusing coil 308 and tracking coil 309 are arranged at the moving body in such a fashion that they face the yoke 306 and first magnets 303, as in the conventional case. In accordance with such an arrangement, forces serving to move the moving body in upward, downward, left, and right directions are generated, based on the operation principle illustrated in FIGS. 4a and 4b. By virtue of these forces, desired focusing and tracking operations are conducted.

In similar to the above mentioned radial and tangential tilting operations, the magnetic circuit generates magnetic flux at the focusing coil 308 and tracking coil 309 when current flows through the focusing coil 308 and tracking coil 309 in an appropriate direction in accordance with the polarity of the magnets, so that a drive force is generated in a desired direction in accordance with an interlinkage of the magnetic flux.

Thus, the optical pick-up actuator can conduct a quadaxial driving operation, and obtain desired frequency response characteristics as it is supported by the wire springs 311. Accordingly, the optical pick-up actuator c on receive a tilt-compensation error signal from a sensor, along with focusing and tracking error signals similar to those in the conventional case. Therefore, a servo capable of following a disk applied to the optical pick-up actuator can be implemented.

In accordance with the first embodiment in which the optical pick-up actuator drives the moving body in four directions in accordance with quadaxial forces, respectively, a quadaxially-driving optical pick-up actuator can be implemented because the wire springs connected together in the form of a quadric linkage have a desired degree of freedom in four directions, respectively. If it is unnecessary to provide the degree of freedom, for example, in the tangential direction, then the tangential coil is simply removed.

Figure 5:
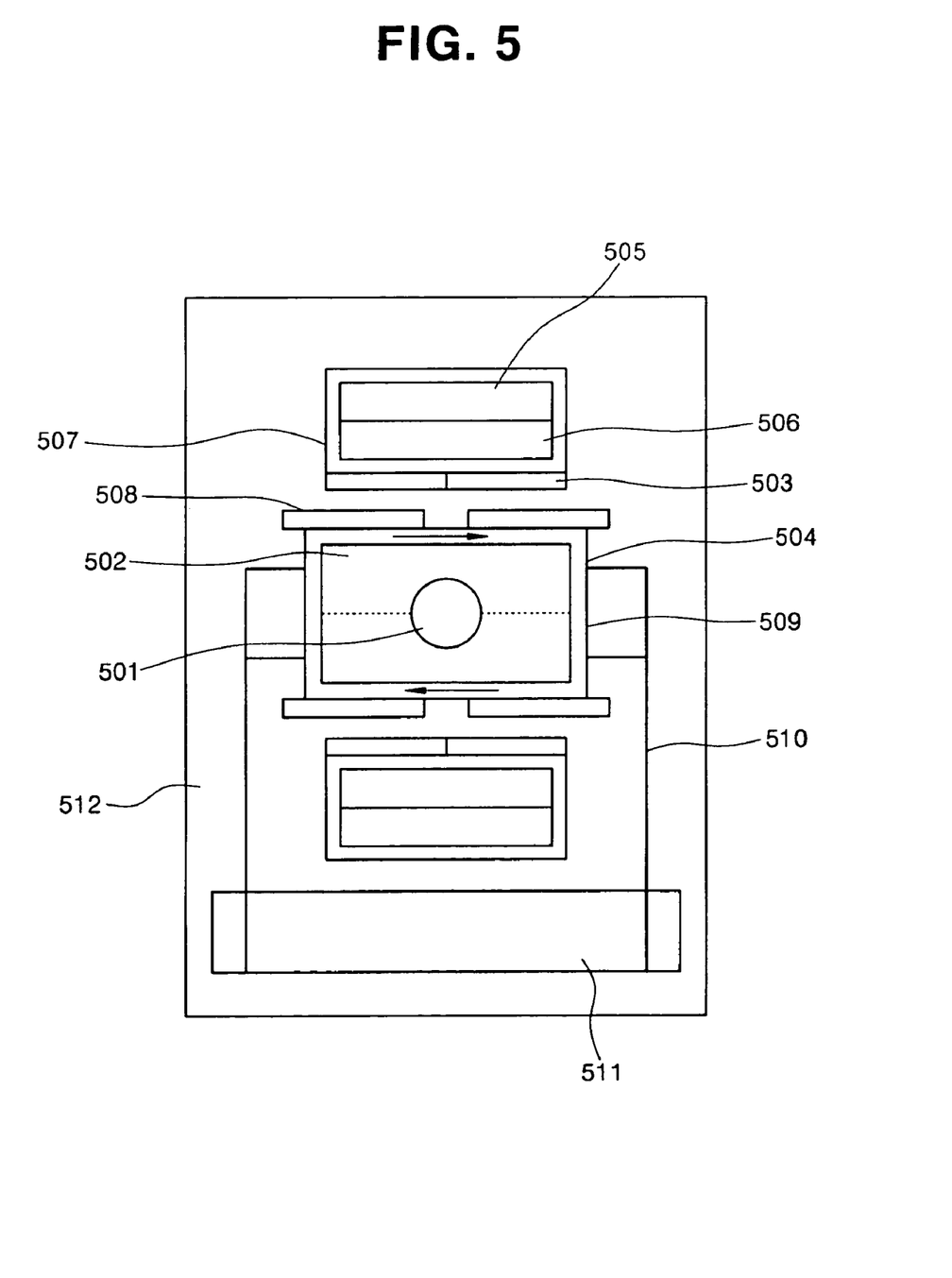
FIG. 5 is a schematic view illustrating the configuration of an optical pick-up actuator according to a second embodiment of the present invention.
Figure 6A:
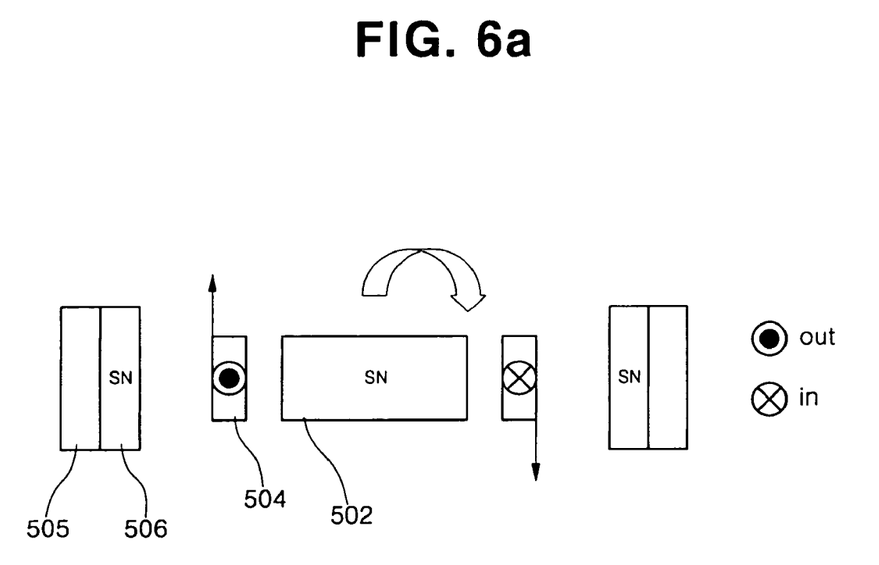
FIGS. 6a to 6d are views illustrating the driving principle of the optical pick-up actuator according to the second embodiment of the present invention in association with each direction.
Figure 6B:
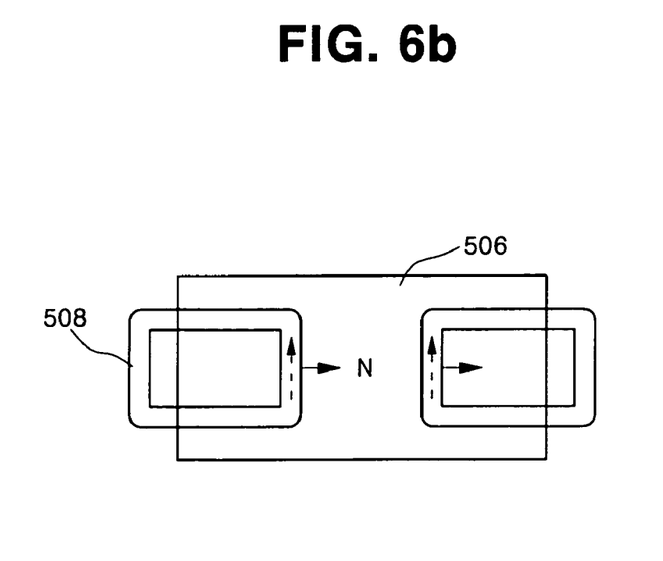
Figure 6C:
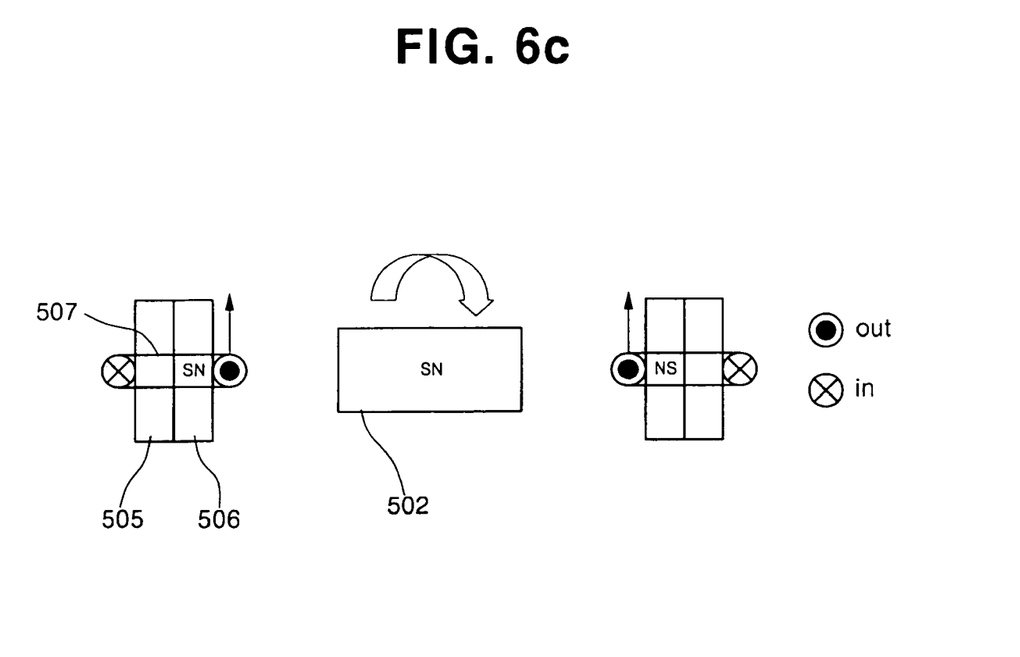
Figure 6D:
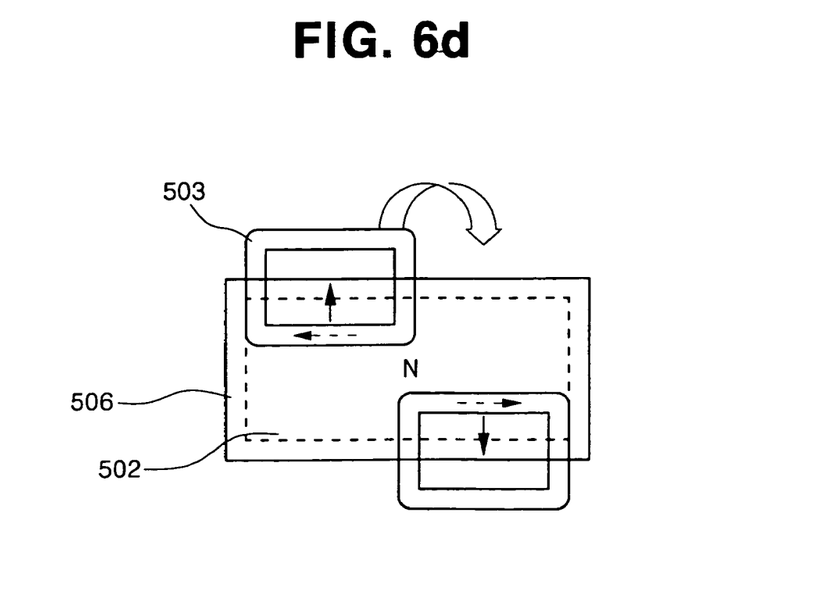

FIG. 5 is a schematic view illustrating the configuration of an optical pick-up actuator according to a second embodiment of the present invention.

As shown in FIG. 5, the optical pick-up actuator according to the second embodiment of the present invention includes a radial coil 503, a tangential coil 507, a yoke 505, a pair of first magnets 506, a focusing coil 504, a tracking coil 508, fixed PCBs 509, a plurality of wire springs 510, and a frame 511. The optical pick-up actuator also includes a second magnet 502 magnetized to have two poles while also serving as a lens holder adapted to hold an object lens 501.

The focusing coil 504 and tracking coil 508 are attached to the second magnet 502 also serving as the lens holder whereas the radial coil 503 and tangential coil 507 are attached to the first magnets 506.

The tangential and radial tilting operations in the optical pick-up actuator according to the second embodiment of the present invention are conducted in a moving magnet fashion whereas the focusing and tracking operations in the same optical pick-up actuator are conducted in a moving coil fashion.

The optical pick-up actuator according to the second embodiment of the present invention has a configuration different from that of the first embodiment in that the object lens 501 can be held and driven without a lens holder because the second magnet 502 is configured to also serve as the lens holder, as compared to the lens holder of the first embodiment.

In accordance with the second embodiment, the second magnet 502 has a lens holder structure magnetized to have two poles and made of a plastic material. Current is applied to the radial coil 503 and tangential coil 507 attached to the first magnets 506 and yoke 505. The direction of the current is determined to correspond to the radial or tangential driving direction, in which a force is generated, in accordance with the polarity of the magnets. Thus, driving operations in radial and tangential driving directions can be conducted.

Where the yoke 505, the first magnets 506, and the second magnet 502 also serving as the lens holder form a magnetic circuit, and the focusing coil 504 and tracking coil 508 are arranged at the moving body, it is possible to achieve driving operations in the focusing or tracking driving directions when the current is applied to the coils in accordance with the polarities of the magnets.

FIGS. 6a to 6d are views illustrating the driving principle of the optical pick-up actuator according to the second embodiment of the present invention associated with respective directions.

As shown in FIGS. 6a to 6d, the optical pick-up actuator according to the second embodiment of the present invention is configured to be driven using a quadric link wire spring mechanism having four degrees of freedom.

Of course, if it is unnecessary to provide the degree of freedom, for example, in the tangential direction, then the tangential coil is simply removed from the moving body.

Figure 7:
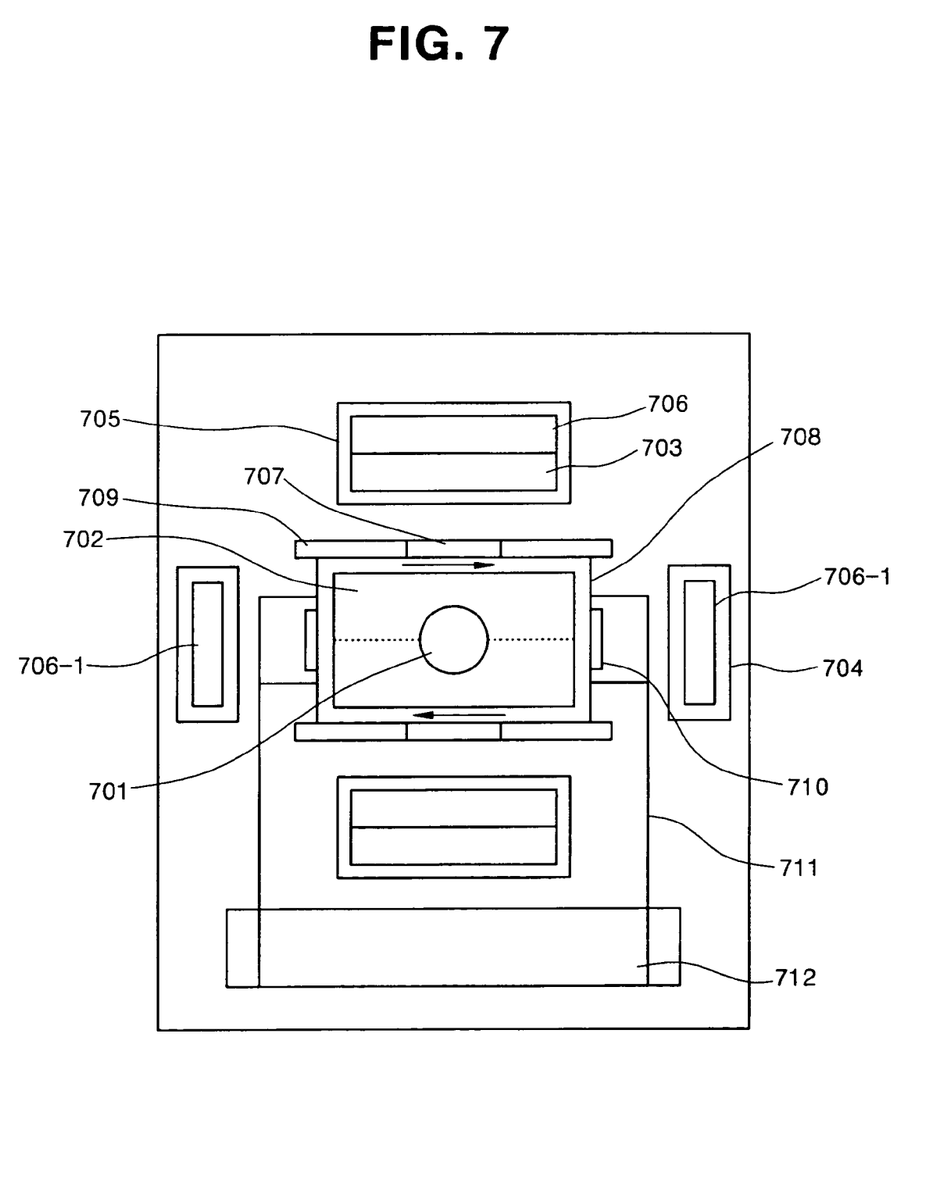
FIG. 7 is a schematic view illustrating the configuration of an optical pick-up actuator according to a third embodiment of the present invention.

FIG. 7 is a schematic view illustrating the configuration of an optical pick-up actuator according to a third embodiment of the present invention.

Referring to FIG. 7, the optical pick-up actuator according to the third embodiment of the present invention includes a lens holder 702 adapted to hold an object lens 701, a pair of first magnets 703, a radial coil 704, a tangential coil 705, a yoke 706, a pair of second magnets 707, a focusing coil 708, a tracking coil 709, a pair of third magnets 710, fixed PCBs, a plurality of wire springs 711, and a frame 712.

The second magnets 707 are magnets for a tangential tilt whereas the third magnets are magnets for a radial tilt. In accordance with the third embodiment of the present invention, a pair of yokes 706-1 are provided in addition to the yoke 706. These additional yokes 706-1 are attached to the radial coil 704.

FIGS. 8a to 8d are views illustrating the driving principle of the optical pick-up actuator according to the third embodiment of the present invention associated with respective directions.

Figure 8A:
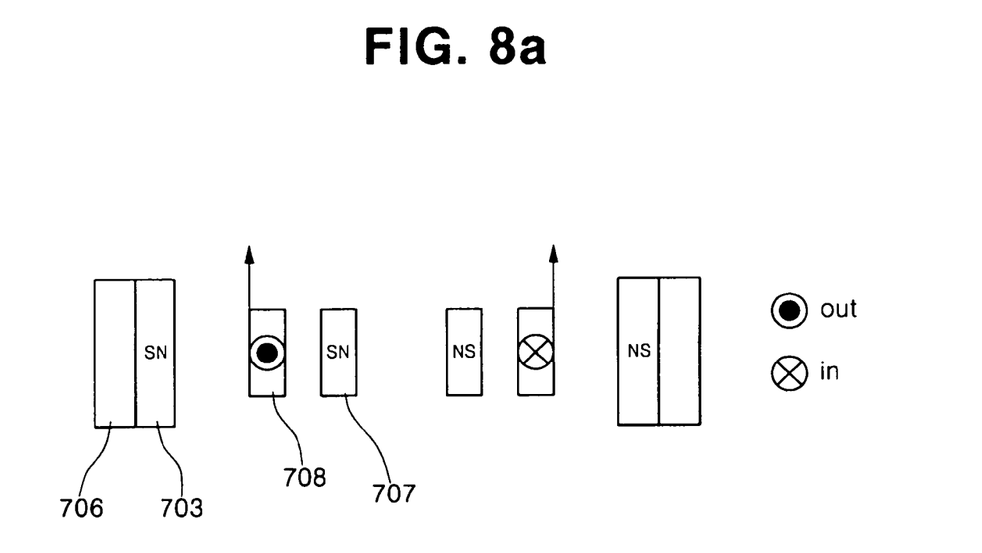
FIGS. 8a to 8d are views illustrating the driving principle of the optical pick-up actuator according to the third embodiment of the present invention in association with each direction.
Figure 8B:
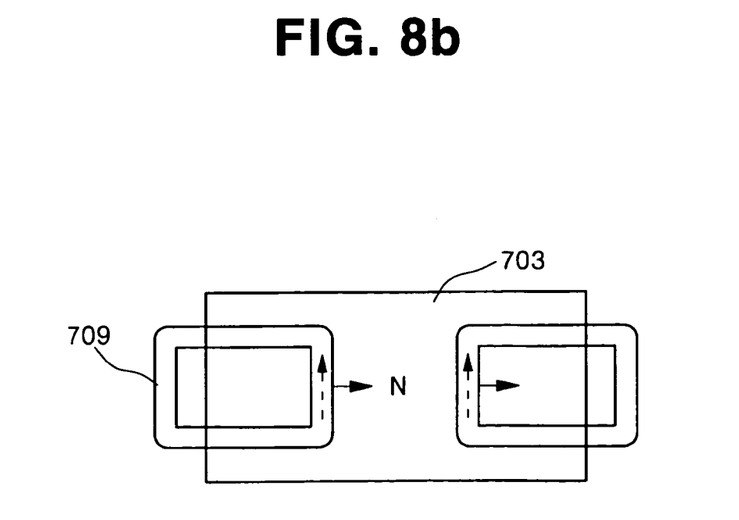
Figure 8C:
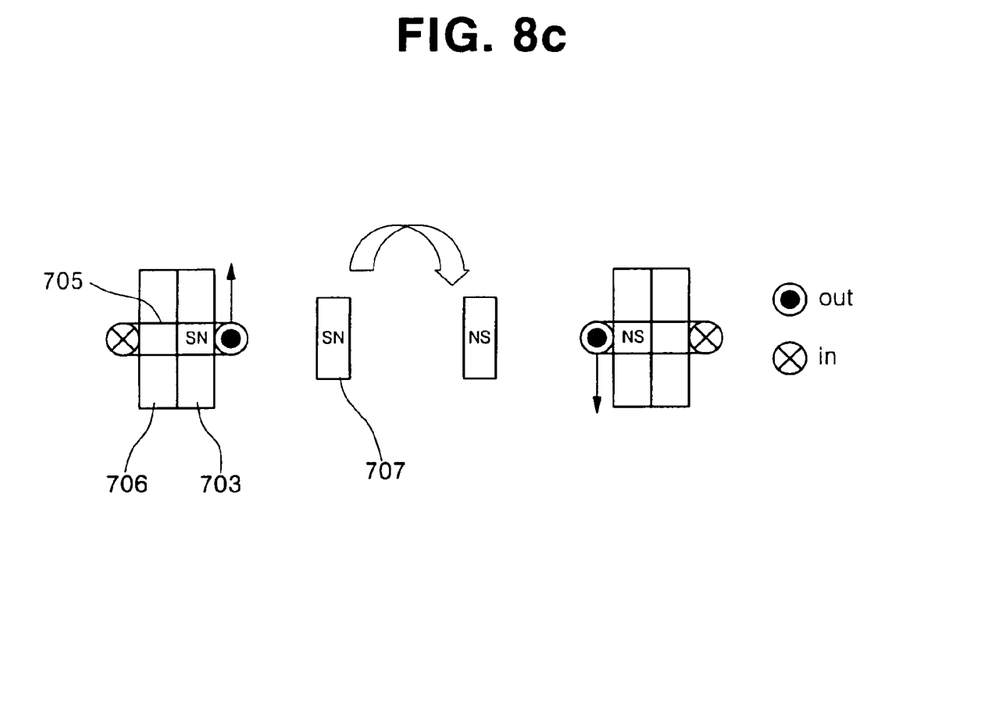

The driving operation of the optical pick-up actuator in the tangential direction is conducted, as shown in FIG. 8c, in accordance with the relation of a magnetic circuit formed by the second magnets 707, that is, the tangential magnets, the yoke 706, and the first magnets 703 with the tangential coil 705.

Figure 8D:
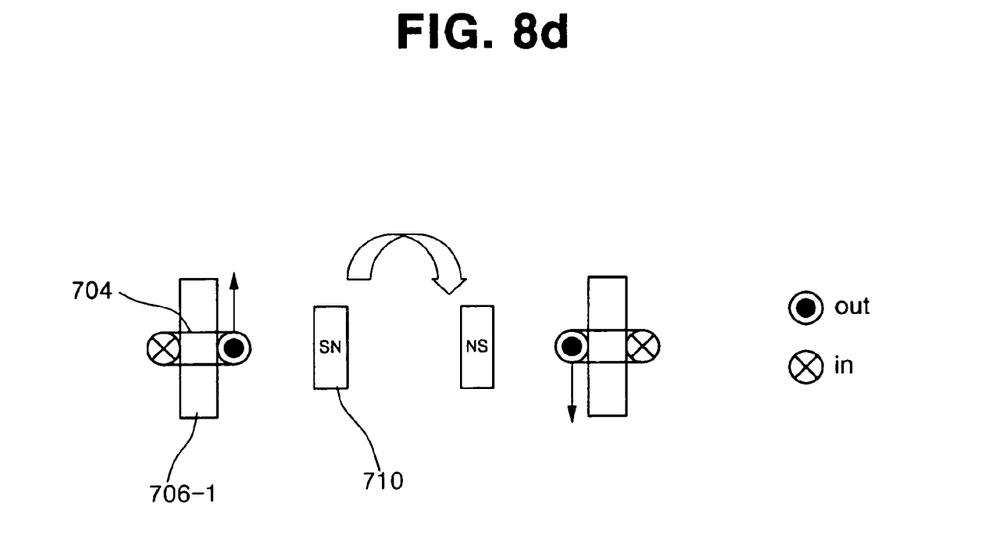

Also, the driving operation of the optical pick-up actuator in the radial direction is conducted, as shown in FIG. 8d, in accordance with the relation of a magnetic circuit formed by the radial magnets 710 and the yokes 706-1 with the radial coil 704.

For focusing and tracking operations, the focusing coil 708 and tracking coil 709 are arranged at the moving body. A magnetic circuit is also formed by the second magnets 707, that is, the tangential magnets, the yoke 706, and the first magnets 703. As shown in FIGS. 8a and 8b, the moving body is moved in upward, downward, left and right directions in accordance with the relation between the magnetic circuit and each of the focusing and tracking coils 708 and 709.

The optical pick-up actuator according to the third embodiment of the present invention has a quadaxially-driving configuration supported by the quadric-link wire springs 711 having four degrees of freedom and adapted to generate desired frequency characteristics.

Of course, if it is unnecessary to provide the degree of freedom, for example, in the tangential direction, in the third embodiment, then the second magnets 707 and tangential coil 705 is simply removed.

As apparent from the above description, the present invention provides an optical pick-up actuator capable of achieving a tilt compensation in addition to focusing and tracking operations while achieving a quadaxial driving operation using a combination of a moving magnet system and a moving coil system, thereby solving the problem involved in the conventional case in association with the connection to a power source.

That is, the supply of power to coils associated with tracking and focusing driving directions or radial and tangential directions is achieved using four wires. The coils associated with the remaining two directions are connected to the fixed body. Thus, it is possible to eliminate the difficulty involved in the connection of power.

The magnetic path for the magnetic circuit unit for focusing and tracking operations and the magnetic path for the magnetic circuit unit for radial and tangential tilting operations are present in the same space. Accordingly, the magnets of the moving body and the magnets of the fixed body face each other. In accordance with such a positional relation, the magnets may serve as a magnetic damper.

In accordance with the present invention, it is also possible to avoid a degradation in the sensitivity in main driving directions, that is, focusing and tracking driving directions, while simplifying the assembling process and the entire configuration.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pick-up actuator mounted with an object lens and driven by a magnetic suspension, thereby recording information on a disk and reproducing the recorded information from a disk, comprising:

first means operated according to a moving coil principle to conduct tracking and focusing operations, the first means comprising a first magnet, a radial coil and a tangential coil; and second means operated according to a moving magnet principle to conduct a tilt compensating operation, the second means comprising a second magnet, wherein, when current flows through the radial coil and tangential coil, a force is generated in accordance with a predetermined law, the force driving the first means, and magnetic flux is generated at the radial coil and tangential coil by a magnetic circuit formed by the first magnet and second magnet.

2. The optical pick-up actuator according to claim 1, wherein the second means is adapted to conduct a tilt compensation in a tangential direction and a tilt compensation in a radial direction.

3. The optical pick-up actuator according to claim 1, the second means further comprising a plurality of magnets for conducting a tilt compensation in a tangential direction and a tilt compensation in a radial direction.

4. An optical pick-up actuator comprising:

a moving part which includes a lens holder mounted with an object lens, a magnet and coils at an outer surface of said moving part;

a fixed part which includes a magnet attached on a yoke and coils at an outer surface of said fixed part; and a plurality of supporting means adapted to support said moving part;

wherein said moving part and said fixed part have a configuration of a combination of a moving coil system and a moving magnet system;

wherein a flux linkage resulting from the magnetic circuit of both said moving part and said fixed part exists in a space between said moving part and said fixed part.

* * * * *